United States Patent
Vandormael et al.

(10) Patent No.: US 10,076,888 B2
(45) Date of Patent: Sep. 18, 2018

(54) MULTI-LAYER MATERIALS AND ARTICLES MADE THEREFROM AND METHODS OF MAKING

(71) Applicant: Sabic Global Technologies B.V., Bergen op Zoom (NL)

(72) Inventors: Bart Vandormael, Arendonk (BE); Jordi de Tera Alvarez, Barcelona (ES); Muhammad Aslam, Bergen op Zoom (NL); Josephus Gerardus M. van Gisbergen, Bergen op Zoom (NL); Johannes Wilhelmus Henricus Kolnaar, Veldhoven (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/566,264

(22) PCT Filed: Apr. 26, 2016

(86) PCT No.: PCT/IB2016/052362
§ 371 (c)(1),
(2) Date: Oct. 13, 2017

(87) PCT Pub. No.: WO2016/174577
PCT Pub. Date: Nov. 3, 2016

(65) Prior Publication Data
US 2018/0117871 A1    May 3, 2018

(30) Foreign Application Priority Data
Apr. 28, 2015 (EP) .................... 15382213

(51) Int. Cl.
*B32B 1/02* (2006.01)
*B32B 27/08* (2006.01)
*B32B 27/36* (2006.01)

(52) U.S. Cl.
CPC ............... *B32B 1/02* (2013.01); *B32B 27/08* (2013.01); *B32B 27/365* (2013.01);
(Continued)

(58) Field of Classification Search
CPC ......... B32B 1/02; B32B 27/08; B32B 27/365; B32B 2250/244; B32B 2439/80;
(Continued)

(56) References Cited

U.S. PATENT DOCUMENTS

| | | |
|---|---|---|
| 4,482,586 A | 11/1984 | Smith et al. |
| 4,513,037 A | 4/1985 | Collins |

(Continued)

FOREIGN PATENT DOCUMENTS

| | | |
|---|---|---|
| EP | 0270374 A2 | 6/1988 |
| EP | 0483087 A1 | 4/1992 |

(Continued)

OTHER PUBLICATIONS

Deilmann et al.; "FTIR Analysis of Plasma Polymerized SIOx Films for Diffusion Barrier Coatings of Pet Bottles"; 28th ICPIG; Jul. 15-20, 2007; 1 page.

(Continued)

*Primary Examiner* — Michael C Miggins
(74) *Attorney, Agent, or Firm* — Cantor Colburn LLP (57) ABSTRACT

In an embodiment, a multi-layer article having an interior, the article comprises a second layer comprising a bisphenol A polycarbonate; and an inner layer comprising a terephthalic copolyester; polyethylene furanoate; or a combination comprising at least one of the foregoing; wherein the inner layer forms a barrier between the second layer and the interior. The article has at least one of: a decrease in transparency of less than or equal to 5% after sterilization in an autoclave for 30 minutes at 120° C., and a decrease in (Continued)

transparency of less than or equal to 5% after 50 cycles of hot filling with water for 30 minutes at 90° C.

17 Claims, 3 Drawing Sheets

(52) U.S. Cl.
CPC ... *B32B 2250/244* (2013.01); *B32B 2307/412* (2013.01); *B32B 2307/7244* (2013.01); *B32B 2439/60* (2013.01); *B32B 2439/70* (2013.01); *B32B 2439/80* (2013.01)

(58) Field of Classification Search
CPC ........ B32B 2307/7244; B32B 2439/60; B32B 2439/70; B32B 2307/412
See application file for complete search history.

(56) References Cited

U.S. PATENT DOCUMENTS

| | | | |
|---|---|---|---|
| 4,619,973 | A | 10/1986 | Smith, Jr. |
| 4,684,553 | A | 8/1987 | Sasaki et al. |
| 4,732,944 | A | 3/1988 | Smith, Jr. |
| 4,906,703 | A | 3/1990 | Bolton et al. |
| 6,447,859 | B2 | 9/2002 | Oguro et al. |
| 7,169,880 | B2 | 1/2007 | Shelby et al. |
| 7,297,755 | B2 | 11/2007 | Shelby et al. |
| 7,803,440 | B2 | 9/2010 | Crawford et al. |
| 7,893,188 | B2 | 2/2011 | Crawford et al. |
| 7,915,376 | B2 | 3/2011 | Crawford et al. |
| 8,287,970 | B2 | 10/2012 | Pecorini et al. |
| 2006/0287496 | A1 | 12/2006 | Crawford et al. |
| 2012/0305575 | A1 | 12/2012 | Burgess et al. |
| 2014/0295363 | A1 | 10/2014 | Sun et al. |
| 2015/0217331 | A1 | 8/2015 | Stoehr et al. |

FOREIGN PATENT DOCUMENTS

| | | |
|---|---|---|
| EP | 1466725 A1 | 10/2004 |
| GB | 2019780 A1 | 11/1979 |
| JP | 04062152 A | 2/1992 |
| JP | 04115938 A | 4/1992 |
| JP | 05008358 A | 1/1993 |
| JP | 5124094 B2 | 5/1993 |
| JP | 05177796 A | 7/1993 |
| JP | 05177797 A | 7/1993 |
| JP | 05212841 A | 8/1993 |
| JP | 2000255540 | 9/2000 |
| JP | 5244622 B2 | 7/2013 |
| WO | 2013175448 A1 | 11/2013 |
| WO | 2014012982 A1 | 1/2014 |
| WO | 2014072923 A1 | 5/2014 |

OTHER PUBLICATIONS

Deilmann et al.; "Pulsed microwave plasma polymerization of silicon oxide films: application of efficient permeation barriers on polyethylene terephthalate"; Author's version of accepted paper for Surface and Coatings Technology; Aug. 2007; 18 pages.

Gotro et al.; "Polyethylene Furanoate (PEF): 100% Biobased Polymer to Compete with PET?"; http://polymerinnovationblog.com/polyethylene-furanoatepef-100-biobased-polymer-to-compete-with-pet; Apr. 8, 2013; 7 pages.

International Search Report for International Application No. PCT/IB2016/052362; International Filing Date: Apr. 26, 2016; dated Aug. 11, 2016; 5 pages.

M. Walther et al., Multilayer barrier coating system produced by plasma-impulse chemical vapor deposition (PICVD); Surface and Coatings Technology 80, pp. 200-202, (1996).

Written Opinion of the International Search Report for International Application No. PCT/IB2016/052362; International Filing Date: Apr. 26, 2016; dated Aug. 11, 2016; 6 pages.

MULTI-LAYER MATERIALS AND ARTICLES MADE THEREFROM AND METHODS OF MAKING

CROSS REFERENCE TO RELATED APPLICATIONS

This application is a National Stage application PCT/IB2016/052362, filed Apr. 26, 2016, which claims the benefit of European Application No. 15382213.5, filed Apr. 28, 2015, both of which are incorporated by reference in their entirety herein.

TECHNICAL FIELD

This disclosure relates to multi-layer materials and articles made therefrom.

BACKGROUND

Containers, such as water bottles and food containers are currently made from many different types of materials, including plastics and glass. For example, food packaging and healthcare containers are often formed of glass in order to provide transparency, adequate oxygen and/or water barrier properties, and/or to address sterilization or hot filling processes. Glass containers, however, can fracture or break during production or transportation, which means production lines can be interrupted or stopped and/or goods can be rejected. Currently, glass that is used for packaging can withstand high heat sterilization conditions, hot filling, and remain transparent and/or possesses the capability for a long shelf-life. However the high energy costs involved with glass container production, the heavy weight of glass, and its fragility with production, transport, and consumer use are cumbersome.

While polymers such as PET (polyethylene terephthalate), PBT (polybutylene terephthalate), PEF (polyethylene furanoate), and PEN (polyethylene naphthalate) can possess better barrier properties for plastic bottles under select conditions(e.g., to water, oxygen ($O_2$) and/or carbon dioxide ($CO_2$) permeation) compared to polycarbonates, such materials can become hazy following heat treatment above the glass temperature of such materials. This haze formation can be due to inherent polymer properties (e.g., glass transition temperature (Tg) and crystallization half time) of these types of materials.

There accordingly is a need in the art for polycarbonate articles (e.g., bottles and food containers) that include improved functional barrier layers to prevent gas permeation and the migration of certain substances (for example, $O_2$, $CO_2$, and other components) between the articles (e.g., packaging) and the contents in the articles, while continuing to provide the beneficial attributes of polycarbonate materials such as one or more of transparency, strength, and thermal stability desired for many applications.

SUMMARY

Disclosed herein is an article, a method of making and using the same.

In an embodiment, a multi-layer article having an interior, the article comprises a second layer comprising a bisphenol A polycarbonate; and an inner layer comprising a terephthalic copolyester; polyethylene furanoate; or a combination comprising at least one of the foregoing; wherein the inner layer forms a barrier between the second layer and the interior. The article has at least one of: a decrease in transparency of less than or equal to 5% after sterilization in an autoclave for 30 minutes at 120° C., and a decrease in transparency of less than or equal to 5% after 50 cycles of hot filling with water for 30 minutes at 90° C.

In an embodiment, a method of making the multi-layer article comprises forming the article with the second layer and the inner layer using thermoforming, blow molding, extrusion blow molding, extrusion stretch molding, injection molding, injection blow molding, injection stretch blow molding, over-molding, injection over-molding, or a combination comprising at least one of the foregoing.

Further features of the article and methods are set forth below in the detailed description and figures.

BRIEF DESCRIPTION OF THE DRAWINGS

Refer now to the figures, which are exemplary embodiments, and wherein the like elements are numbered alike.

DETAILED DESCRIPTION

For packaging applications in the food and healthcare industries, acceptable limits of gas permeation through containers and the presence of certain components in the containers are becoming more stringent. While efforts have been made to provide barrier coatings, for example, for PET articles, it was found that such bi-layer systems become hazy when subjected to 90° C. for greater than or equal to 30 minutes, for example, as would occur during typical sterilization processes. It was surprisingly discovered that a multi-layer material comprising a polyester inner layer and a polycarbonate second layer with a transmission of greater than 90% and a haze value of less than 2.5% was able to maintain the transmission and haze values after sterilization and/or thermal cycling. The fact that the present multi-layer structure can maintain its transparency during sterilization is particularly surprising as the glass transition temperature (Tg) of the polyester layer is generally lower than the sterilization temperature. Without being bound by theory, it is believed that a certain synergy arises between the inner layer and the second layer that allows the multi-layer material to maintain its transparency and its dimensional stability.

Specifically, the multi-layer material comprises a second layer (also referred to herein as a polycarbonate layer) formed at least in part of polycarbonate material and an inner layer (also referred to herein as the first layer or a polyester layer) formed at least in part of a polyester. The multi-layer material can be formed into a container (e.g., bottles and specifically for water bottles and baby bottles), for example, by thermoforming, blow molding, co-extrusion, injection molding, over-molding, or any combination comprising at least one of the foregoing; e.g., extrusion blow molding, extrusion stretch molding, injection blow molding, injection stretch blow molding, injection over-molding.

The containers formed from the multi-layer materials are configured such that the polycarbonate layer is not on an interior side. In other words, the polycarbonate layer is not in a location where it can directly, physically contact the contents of the container. Therefore, the inner layer that physically contacts the contents of the container is free of polycarbonate. For example, the polycarbonate layer can be on the exterior or outside of the container or between layers of the container (e.g., between an outer layer and an inner layer of the container). In this manner, the inner layer is in contact with the contents within the container (e.g., liquid (for example, a beverage (such as soda, water, juice, alcohol, etc.), food, or healthcare products (for example, cosmetic products, medicament, or the like)).

The inner layer can comprise a polyester (such as polyethylene naphthalate (PEN) or polyethylene furanoate (PEF)), a terephthalic copolyester (such as a poly(2,2,4,4-tetramethyl-1,3-cyclobutylene terephthalate)-co-poly(cyclohexanedimethylene terephthalate) (PTCC); poly(cyclohexanedimethylene terephthalate)-co-poly(ethylene terephthalate) comprising greater than 50 mol % to 99.9 mol % of poly(1,4-cyclohexanedimethylene terephthalate) (PCTG); poly(cyclohexanedimethylene terephthalate)-co-poly(ethylene terephthalate) comprising greater than 50 mol % to 99.9 mol % of poly(ethylene terephthalate) (PETG); or poly(pentaspiroglycol terephthalate)-co-poly(ethylene terephthalate). A combination comprising one or more of the foregoing polyesters or copolyesters can be used.

The inner layer can comprise a terephthalic copolyester derived from terephthalic acid, optionally a dicarboxylic acid other than terephthalic acid, and two or more diols. The dicarboxylic acid other than terephthalic acid can comprise aromatic dicarboxylic acid residues having up to 20 carbon atoms (such as isophthalic acid, 4,4'-biphenyl dicarboxylic acid, naphthalene dicarboxylic acid, and trans-4,4'-stilbenedicarboxylic acid), aliphatic dicarboxylic acid residues having up to 16 carbon atoms (such as cyclohexane dicarboxylic acid and malonic, succinic, glutaric, adipic, pimelic, suberic, azelaic, and dodecanedioic dicarboxylic acids), or a combination comprising one or both of the foregoing. The dicarboxylic acid can comprise an indan dicarboxylic acid, for example, indan-1,3-dicarboxylic acids and/or phenylindan dicarboxylic acids, specifically, 1,2,3-trimethyl-3-phenylindan-4',5-dicarboxylic acid and 1,1,3-trimethyl-5-carboxy-3-(4-carboxyphenyl)indan dicarboxylic acid. It is to be understood that reference to a polyester being derived from an "acid" herein includes polyesters derived from the corresponding reactive derivatives of the acid, including the corresponding $C_{1-6}$ alkyl or phenyl ester, salt, or carbonyl halide, e.g., dimethyl terephthalate or terephthaloyl chloride (1,4-benzenedicarbonyl chloride). In some embodiments, esters of the carboxylic acid and/or salts can be used instead of the dicarboxylic acids. Examples of dicarboxylic acid esters include dimethyl, diethyl, dipropyl, diisopropyl, dibutyl, and diphenyl esters.

The dicarboxylic acid can comprise 70 to 100 mole percent (mol %) of terephthalic acid; 0 to 30 mol % of aromatic dicarboxylic acid having up to 20 carbon atoms; and 0 to 10 mol % of aliphatic dicarboxylic acid having up to 16 carbon atoms; based on the total moles of the dicarboxylic acid.

The two or more diols can comprise 2,2,4,4-tetramethyl-1,3-cyclobutanediol, cyclohexane dimethanol, ethylene glycol, diethylene glycol, 1,2-propanediol, 1,3-propanediol, neopentyl glycol, 1,4-butanediol, 1,5-pentanediol, 1,6-hexanediol, p-xylene glycol, polytetramethylene glycol, 2,2-dimethyl-1,3-propanediol, 3,9-bis(1-1-dimethyl-2-hydroxyethyl)-2,4,8,10-tetraoxaspiro[5,5]undecane ("spiroglycol"), or the like. The cyclohexanedimethanol can be cis-, trans-, or a mixture thereof. For example, a ratio of cis:trans cyclohexanedimethanol can be 60:40 to 40:60 or 70:30 to 30:70. 1,1-, 1,2-, 1,3-, 1,4-isomers of cyclohexanedimethanol or mixtures thereof can be present in the glycol. The cyclohexanedimethanol can comprise 1,4-cyclohexanedimethanol and 1,3-cyclohexanedimethanol, or a combination comprising one or both of the foregoing. The cyclohexanedimethanol can comprise 1,4-cyclohexanedimethanol (CHDM).

The two or more diols can comprise 1 to 99 mol % of 2,2,4,4-tetramethyl-1,3-cyclobutanediol and 1 to 99 mol % of 1,4-cyclohexanedimethanol or 80 to 99 mol %, specifically, 85 to 98 mol %, of 2,2,4,4-tetramethyl-1,3-cyclobutanediol and 1 to 20 mol % of a second diol based on the total moles of the diol. The second diol can comprise ethylene glycol, cyclohexanedimethanol, or a combination comprising at least one of the foregoing.

Alternatively, the at least two diols can comprise 1 to 99 mol % of ethylene glycol and 1 to 99 mol % of 1,4-cyclohexanedimethanol. For example, the two or more diols can comprise greater than 50 to 99 mol %, specifically, 55 to 90 mol %, of cyclohexane dimethanol (specifically, CHDM) and 1 to less than 50 mol %, specifically, 10 to 49 mol % of ethylene glycol, each based on the total moles of diol. Alternatively, the two or more diols can comprise 1 to less than 50 mol %, specifically, 10 to 49 mol %, of cyclohexane dimethanol (specifically CHDM) and greater than 50 to 99 mol % or 51 to 90 mol % of ethylene glycol.

In still other embodiments, the two diols can comprise a combination of pentaspiroglycol and ethylene glycol. The poly(pentaspiroglycol terephthalate)-co-poly(ethylene terephthalate) (also referred to as a pentaspiroglycol copolyester or the spiroglycol copolyester) is a copolyester derived from pentaspiroglycol, ethylene glycol, and terephthalic acid. The spiroglycol copolyester can be derived from a monomer mixture comprising a glycol component comprising 5 to 60 mol % of a spiroglycol of Formula I:

and 30 to 90 mol % of ethylene glycol, based on the total moles of diol. The spiroglycol copolyester can further be derived from a dicarboxylic acid component comprising 80 to 100 mol % of terephthalic acid and 0 to 30 mol %, or more than 0 to 30 mol %, of the optional dicarboxylic acid other than terephthalic acid as described above, for example 0 to 30 mol % of aromatic dicarboxylic acid having up to 20 carbon atoms or 0 to 10 mol % of aliphatic dicarboxylic acid having up to 16 carbon atoms; each based on the total moles of the dicarboxylic acid. For example, the dicarboxylic acid component can further comprise isophthalic acid, phthalic acid, 2-methyl terephthalic acid, naphthalene dicarboxylic acid, biphenyl dicarboxylic acid, tetralin dicarboxylic acid, succinic acid, glutaric acid, adipic acid, pimelic acid, suberic acid, azelaic acid, sebacic acid, dodecane dicarboxylic acid, cyclohexane dicarboxylic acid, decalin dicarboxylic acid, norbornane dicarboxylic acid, tricyclodecane dicarboxylic acid, pentacylcododecane dicarboxylic acid, isophorone dicarboxylic acid, 3,9-bis(2-carboxyethyl)-2,4,8,10-tetraoxaspiro[5.5]undecane, trimellitic acid, trimesic acid, pyromellitic acid, tricarballylic acid, or a combination comprising at least one of the foregoing. The glycol component can further optionally comprise a $C_{1-6}$ aliphatic diol, a poly($C_{1-4}$alkylene) glycol, a three or more valent polyhydric $C_{2-12}$ alcohol, a $C_{3-6}$ alicyclic diol, a $C_{1-6}$ alkylene oxide adduct of a bisphenol, a $C_{1-6}$ alkylene oxide adduct of a $C_{6-18}$ aromatic dihydroxy compound, or a combination comprising at least one of the foregoing, in an amount of up to 30 mol % of the glycol component.

The inner polyester can comprise a polyethylene naphthalate that is derived from at least ethylene glycol and naphthalene-2,6-dicarboxylic acid. The inner polyester can comprise greater than or equal to 80 mol % of repeating units of ethylene-2,6-naphthalate, specifically, 85 to 100 mol % of repeating units of ethylene-2,6-naphthalate. The polyethylene naphthalate can further comprise repeat units derived from naphthalene-2,7-dicarboxylate, naphthalene-1,5-dicarboxylate, naphthalene-1,7-dicarboxylate, terephthalic acid, isophthalic acid, diphenyl dicarboxylic acid, diphenoxycarboxylic acid, diphenyl ether dicarboxylic acid, diphenylsulfone dicarboxylic acid, adipic acid, sebacic acid, azelaic acid, p-beta-hydroxyethoxybenzoic acid, epsilon-oxycaproic acid, trimethylene glycol, tetramethylene glycol, hexamethylene glycol, a decamethylene glycol, neopentyl glycol, diethylene-glycol, 1-cyclohexane dimethanol, 1,4-cyclohexane dimethanol, 2,2-bis(4'-beta-hydroxyphenyl)propane, bis(4'-beta-hydroxyethoxyphenyl)sulfonic acid, or a combination comprising at least one of the foregoing.

The inner polyester can comprise polyethylene furanoate. Polyethylene furanoate is derived by reaction of a glycol component comprising ethylene glycol and a dicarboxylic acid component comprising 2,5-furan dicarboxylic acid. The ethylene glycol component can further comprise 0 to 20 mol % of another glycol, e.g., 2,2,4,4-tetramethyl-1,3-cyclobutanediol, cyclohexane dimethanol (specifically, CHDM), diethylene glycol, 1,2-propanediol, 1,3-propanediol, neopentyl glycol, 1,4-butanediol, 1,5-pentanediol, 1,6-hexanediol, p-xylene glycol, polytetramethylene glycol, 2,2-dimethyl-1,3-propanediol or a combination comprising at least one of the foregoing, based on the total moles of the glycol component. The dicarboxylic acid component can further comprise 0 to 20 mol % of another dicarboxyl acid, for example, terephthalic acid, isophthalic acid, phthalic acid, 2-methyl terephthalic acid, naphthalene dicarboxylic acid, biphenyl dicarboxylic acid, tetralin dicarboxylic acid, succinic acid, glutaric acid, adipic acid, pimelic acid, suberic acid, azelaic acid, sebacic acid, dodecane dicarboxylic acid, cyclohexane dicarboxylic acid, decalin dicarboxylic acid, norbornane dicarboxylic acid, tricyclodecane dicarboxylic acid, isophorone dicarboxylic acid, pentacylcododecane dicarboxylic acid, 3,9-bis(2-carboxyethyl)-2,4,8,10-tetraoxaspiro[5.5]undecane, trimellitic acid, trimesic acid, pyromellitic acid, tricarballylic acid, or a combination comprising at least one of the foregoing.

The terephthalic copolyester (for example, PTTC, PCTG, PETG, or the spiroglycol copolyester), can have one or both of a Tg of 110 to 200° C. and an inherent viscosity of 0.35 to less than 0.70 deciliters per gram (dL/g) as determined in 60:40 (wt:wt) phenol:tetrachloroethane solution at 25° C. at a concentration of 0.5 grams per 100 milliliters.

The second layer comprises a polycarbonate, specifically, a polycarbonate comprising repeat units derived from bisphenol A. "Polycarbonate" as used herein means a polymer or copolymer having repeating structural carbonate units of the formula (1)

wherein at least 60% of the total number of $R^1$ groups are aromatic, or each $R^1$ contains at least one $C_{6-30}$ aromatic group. Polycarbonates and their methods of manufacture are known in the art, being described, for example, in WO 2013/175448 A1, US 2014/0295363, and WO 2014/072923. Polycarbonates are generally manufactured from bisphenol compounds such as 2,2-bis(4-hydroxyphenyl) propane ("bisphenol-A" or "BPA"), 3,3-bis(4-hydroxyphenyl) phthalimidine, 1,1-bis(4-hydroxy-3-methylphenyl)cyclohexane, or 1,1-bis(4-hydroxy-3-methylphenyl)-3,3,5-trimethylcyclohexane, or a combination comprising at least one of the foregoing bisphenol compounds can also be used. The polycarbonate can be a homopolymer derived from BPA; a copolymer derived from BPA and another bisphenol or dihydroxy aromatic compound such as resorcinol; or a copolymer derived from BPA and optionally another bisphenol or dihydroxyaromatic compound, and further comprising non-carbonate units, for example, aromatic ester units such as resorcinol terephthalate or isophthalate, aromatic-aliphatic ester units based on $C_{6-20}$ aliphatic diacids, polysiloxane units such as polydimethylsiloxane units, or a combination comprising at least one of the foregoing.

Other polycarbonates can also be used for the second layers provided herein. For example, and while not to be construed as limiting, polycarbonates made from Bisphenol A with reduced sulfur content in accordance with PCT Published Application No. WO 2013/061274A1, published on 2 May 2013, can be used for polycarbonate materials disclosed herein. Polycarbonates formed in accordance with PCT Published Application No. WO 2013/061274A1 can be used with the inner layers disclosed herein to form containers such as bottles, bowls, storage containers, pans, and so forth.

In addition to the polycarbonates described above for use in the second layer, combinations of the polycarbonate with other thermoplastic polymers, for example, homopolycarbonates or polycarbonate copolymers (e.g., polyester-carbonates), alone or in combination with a polyester, can be used.

Polyester-carbonates and polyesters (referred to as a second polyester) for use in the second layer can comprise repeating units of formula (2)

wherein J is a divalent group derived from a dihydroxy compound (which includes a reactive derivative thereof), and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene. Copolyesters containing a combination of different T and/or J groups can be used. The polyester units can be branched or linear. The second polyesters described herein are generally completely miscible with the polycarbonates when blended. The weight ratio of polycarbonate and a second polyester can be 100:0 to 1:99, specifically, 1:99 to 99:1, more specifically, 20:80 to 80:20 or 100:0 to 80:20.

The second polyester can be the same as the inner polyester. Possible second polyesters for use with polycarbonates as the second layers can include aromatic polyesters, poly(alkylene esters) including poly(alkylene arylates), and poly(cycloalkylene diesters). Aromatic polyesters can include, for example, poly(ethylene terephthalate) (PET), poly(1,4-butylene terephthalate) (PBT), and poly(propylene terephthalate) (PPT), poly(isophthalate-terephthalate-resorcinol) esters, poly(isophthalate-terephthalate-bisphenol A) esters, poly(furanoate) esters, poly[(isophthalate-terephthalate-resorcinol) ester-co-(isophthalate-terephthalate-bisphenol A)] ester, or a combination comprising at least one of these. The second polyester can comprise poly(alkylene terephthalates), such as PETG and PCTG; poly(alkylene naphthalates), such as poly(ethylene naphthalate) (PEN), and poly(butylene naphthalate) (PBN); a poly(cycloalkylene diester) such as poly(cyclohexane-1,4-dimethylene terephthalate) (PCT); a poly(cyclohexane-1,4-dimethylene terephthalate/isophthalate) (PCTA); or a combination comprising at least one of the foregoing. The second layer can comprise a blend of a polycarbonate and a second polyester, for example, a pentaspiroglycol copolyester as described above. Also contemplated are aromatic polyesters with a minor amount, e.g., 0.5 to 10 weight percent, based on the total weight of the polyester, of units derived from an aliphatic diacid and/or an aliphatic polyol to make copolyesters. The second polyester can comprise a poly(cycloalkylene diester) such as a poly(alkylene cyclohexanedicarboxylate). A specific example of which is poly(1,4-cyclohexane-dimethanol-1,4-cyclohexanedicarboxylate) (PCCD), having recurring units of formula (3).

(3)

The second layer can comprise a recycled or regrind material. For example, the recycled material for the container can include blends of polycarbonates and polyesters such as those described above. The use of recycled materials can be desirable in certain applications such as beverage bottles (e.g., water bottles), and can facilitate reductions in material costs. For example, the recycled material can comprise recycled polycarbonate and recycled polyester (such as blends of polycarbonate and a terephthalic copolyester such as PTTC, PETG, or PCTG, or polycarbonate and a pentaspiroglycol copolyester) from regrind or recycled multi-layer water bottles. It will be appreciated that the amount of recycled material in the second layer can vary depending on the intended use of the container. For example, the second layer can comprise 10 to 100 wt %, specifically, 30 to 70 wt % new polycarbonate; 0 to 80 wt %, specifically, 0 to 50 wt % of a new polyester; and 0 to 80 wt %, specifically, 30 to 70 wt % of a recycled polyester and/or a recycled polycarbonate based on the total weight of the thermoplastic composition. For example, the thermoplastic composition for the second layer can comprise 10 to 100 wt % new polycarbonate; and greater than 0 to 80 wt % of a new polyester; and/or greater than 0 to 80 wt % of a recycled polyester and/or a recycled polycarbonate based on the total weight of the composition. Such percentages can be dependent on desired properties, for example, transparency and/or desired barrier properties for adequate shelf life.

The second layer of the containers disclosed herein can be formed, for example, of LEXAN™ PK2870 resin, available from SABIC's Innovative Plastics business. Such material can be particularly useful in extrusion blow molding applications. This material can have excellent physical properties, including: a melt volume ratio (MVR) of 2 to 15, more specifically, 2 to 9 centimeters cubed ($cm^3$)/10 minutes, measured at 300° C. under a load of 1.2 kilograms (kg) in accordance with ASTM D1238-04.

The second layer can further have a heat deflection temperature (HDT) of 130 to 160° C., more specifically, 140 to 145° C., measured at 0.45 megaPascal (MPa) according to ASTM D648 using a 3.2 mm thick, molded bar. The second layer can further have a Charpy Notched Impact of 30 to 80 kiloJoule per meters squared ($kJ/m^2$) at 23° C. in accordance with ISO 179/1 eA. The second layer can further have an Izod Notched Impact of 50 to 80 $kJ/m^2$ at 23° C. in accordance with ISO 180/1A. The second layer can have a transparency of greater than or equal to 75%, or greater than or equal to 90%, or greater than or equal to 95%.

The polycarbonate can comprise PK2870-BL8E055T that is a blue colored grade with a transmission and haze of respectively 83.5% and 3.2% measured according to ASTM D1003 on a BYK Dual Haze guard. The natural polycarbonate grade PK2870-11204 has a transmission and haze of respectively 91.4% and 3.48% measured according to ASTM D1003 on a BYK Dual Haze guard.

The multi-layer material can be a bi-layer (only comprising two layers) or can have more than two layers. For example, the multi-layer article can comprise a polyester third layer that can comprise the same or different polyester as the inner layer. Crystalline polyesters can be used, for example, to achieve higher chemical resistance for non-transparent applications or the like. The third layer can comprise polyethylene terephthalate. The third layer can be an outer layer.

Further, the multi-layer material can comprise an adhesion layer (also referred to as a tie layer), positioned between two layers, for example, between the second layer and one or both of the inner layer and a third layer. The adhesion layer can be included to improve adhesion between two layers and can be formed such that there is no delamination under the normal use conditions of the layers, i.e., no delamination occurs. For example, if the multi-layer material comprises a third layer such that the polycarbonate second layer is located in between a first polyester inner layer and the third layer (e.g., a polyester third layer), an adhesion layer can be located between the second layer and one or both of the inner and third layers. The tie layer can comprise a polyester, a polyethylene, a polyurethane, a polyacrylic, or a combination comprising at least one of the foregoing. The tie layer can comprise a copolymer comprising a polyethylene, a polyurethane, a polyacrylic, or a combination comprising at least one of the foregoing. The adhesion layer can be formed from a polycarbonate-polyester blend material such as XYLEX™ X8409AC, commercially available from SABIC's Innovative Plastics business.

The multi-layer materials and articles formed therefrom can advantageously provide mechanical strength and thermal stability desirable for applications such as beverage bottles (e.g., large water bottles, small water bottles, and baby bottles). For example, the multi-layer material can withstand 50 washing cycles (more specifically, 100 washing cycles) with hot water at 90° C. and can be sterilized by autoclaving for 30 minutes at 120° C. (with moisture and at 2 bar pressure), while maintaining a transparency of greater than or equal to 80%, specifically, greater than or equal to 90%, or greater than or equal to 95%. As used herein, maintaining transparency refers to a decrease in transparency of less than or equal to 5%, specifically, less than or equal to 3%, more specifically, less than or equal to 1%, and even more specifically, no decrease in transparency. As used herein, transparency is measured using 2.5 millimeter (mm) plaque according to ASTM D-1003-00 (Procedure A, Spectrophotometer, using illuminant C with diffuse illumination with unidirectional viewing), unless specifically stated otherwise.

With regard to dimensional stability at high temperatures, sterilization issues can be considered. The glass transition temperature (Tg) is a factor regarding thermal stability. Raising the temperature of a polymer above and below the Tg of the polymer can result in potential losses in one or more of haze, transparency, and dimensions (such as in one or more of the x, y, and z dimensions). Copolyesters such as PETG can have Tg of 81° C.; PTTC can have a Tg of 109° C.; and polycarbonate can have a Tg of 143° C. (e.g., Lexan™ PK2870 resin can have a Tg of 150° C.). Accordingly, by utilizing multi-layer materials as disclosed herein, it was unexpectedly discovered that autoclave and sterilization tests can be conducted above 110° C. without loss of transparency and without loss of dimensional characteristics due to the presence of the polycarbonate in the multi-layer materials. The fact that the present multi-layer structure can maintain its transparency during sterilization is particularly surprising as the Tg of the polyester layer is generally lower than the sterilization layer. Without being bound by theory, it is believed that a certain synergy arises between the inner layer and the second layer that allows the multi-layer material to maintain its transparency and dimensions.

The improved transparency after thermal cycling and/or sterilization can be particularly advantageous in food packaging or healthcare applications where sterilization or hot filling processes are needed. For purposes of illustration, some food manufacturers are still using glass jars due to a lack of an economical solution to replace glass while maintaining the dimensional and transparency characteristics after hot filling at 90° C. for 30 minutes, or where sterilization is needed, for example, by autoclaving for 30 minutes at 120° C. Manufacturers find a decrease in the transparency (e.g., the material turning milky such as due to crystallization caused by the heating) to be unacceptable. For example, this is why jam containers and tomato sauce containers are still made from glass. Containers disclosed herein can be configured to address one or all of these needs.

One or both of the light transmission and haze can be maintained after the above-described thermal cycling and/or the sterilization. Haze and light transmission can be according to ASTM D1003 on a BYK Dual Haze guard.

The multi-layer materials disclosed herein can also provide sufficient water and/or oxygen barrier characteristics, allowing for such articles to be used as containers and/or lids (e.g., for liquids, foods, healthcare products, and so forth) and in other applications where water and/or oxygen migration into the container could be detrimental or result in undesirable consequences. For example, glass has often been used and continues to be utilized for the storage of certain foods in order to reduce or eliminate oxygen migration across the container, thereby reducing food spoilage. Articles, e.g., containers, disclosed herein can be formed to reduce oxygen migration into the container, thereby allowing food, liquid, or healthcare products contained therein to be stored for sufficient periods of time and thus provide adequate shelf-life (e.g., more than 6 months). The containers disclosed herein are expected to allow for the substitution of glass containers in various applications.

In addition, materials for the containers disclosed herein can be formulated to provide desired properties or characteristics. For example, and while not to be construed as limiting, if the contents in a container are intended to include a product having ethanol, PETG and/or PCTG can be used as the inner material, as it is believed that PETG and PCTG have a chemical resistance to ethanol. Likewise, other polyester materials can be considered depending on the properties desired for a particular application.

Barrier properties can be measured according to DIN53380, D3985 ASTM, ISO 15105-1, and ISO 15105-2. For example, the water barrier property (at 23° C. over 24 hours (hrs) at atmospheric pressure (atm)) can be less than or equal to 4.5 grams per meter squared ($g/m^2$), specifically, less than or equal to 4 $g/m^2$, more specifically, less than or equal to 3 $g/m^2$, and even less than or equal to 2 $g/m^2$. The water barrier property (at 38° C. over 24 hours (hrs) at atmospheric pressure (atm)) can be less than or equal to 9 $g/m^2$, specifically, less than or equal to 7 $g/m^2$, more specifically, less than or equal to 5 $g/m^2$, and even less than or equal to 3 $g/m^2$, according to DIN53380.

The carbon dioxide barrier properties (at 23° C. over 24 hrs at atmospheric pressure (atm)) can be less than or equal to 25 centimeters cubed per meter squared ($cm^3/m^2$), specifically, less than or equal to 20 $cm^3/m^2$, more specifically, less than or equal to 18 $cm^3/m^2$, or less than or equal to 15 $cm^3/m^2$. The barrier properties can be particularly advantageous for enhancing the shelf-life of products and can provide alternative materials of construction relative to glass containers for products requiring such barrier properties.

The oxygen barrier property can be: oxygen (at 23° C. over 24 hours (hrs) at atmospheric pressure (atm)) of less than or equal to 7 cubic centimeter per meter squared ($cm^3/m^2$ or $cc/m^2$), specifically, less than or equal to 5 $cm^3/m^2$, more specifically, less than or equal to 4 $cm^3/m^2$, and even less than or equal to 1 $cm^3/m^2$. The multi-layer material can have a theoretical oxygen transfer rate of less than 125 $cc/m^2 \cdot day \cdot atm$, or less than or equal to 100 $cc/m^2 \cdot day \cdot atm$, specifically, less than or equal to 10 $cc/m^2 \cdot day \cdot atm$. In some situations, polyesters can provide three times the oxygen barrier properties of polycarbonate according to DIN53380, D3985 ASTM, and ISO 15105-2.

The theoretical permeability coefficient (theoretical OTR) of a multi-layer structure with total thickness d can be estimated based on the oxygen permeability, composition, and thickness of the individual polyester barrier and polycarbonate layer. The oxygen permeability values in $(cc \cdot mm)/(day \cdot m^2 \cdot atm)$ from the following resins in a non-oriented state (indicated in parentheses) were used in the calculations for the permeability coefficient (theoretical OTR) of total multi-layer structure: polycarbonate (110), PTTC (30), PCTG (10), a pentaspiroglycol copolyester (10), PET (4), PEF, (2), and PEN (1.8).

Compared with polyester mono-layer containers, multi-layer containers are expected to provide for improved strength. For example, the flexural modulus of polycarbonate can be greater than or equal to 2,300 megapascals (MPa) whereas polyesters such as PTTC can exhibit flexural modulus of only 1,580 MPa, the flexural modulus of PETG can be 1,950 MPa, the flexural modulus of PCTG is 1,900 MPa, and the flexural modulus of PCTA can be 1,800 MPa. Moreover, multi-layer containers are expected to provide improved UV stability and improved aging, for example, a reduced hazing following a weathering cycle compared with certain polyester mono-layer approaches such as PTTC, determined according to ISO11341.

The multi-layer configurations provided herein advantageously allow for containers to be formed in an economical manner. Depending on the cost of the materials used, for example, providing water bottles with multi-layer configurations as disclosed herein allows for the second layer to comprise polycarbonate, which can be less expensive than polyester. In some applications, for example, where oxygen migration is not a significant factor, the second layer (polycarbonate or recycled material) can be the thicker layer, thereby further reducing cost while providing sufficient mechanical strength and thermal stability.

Figure 1A:
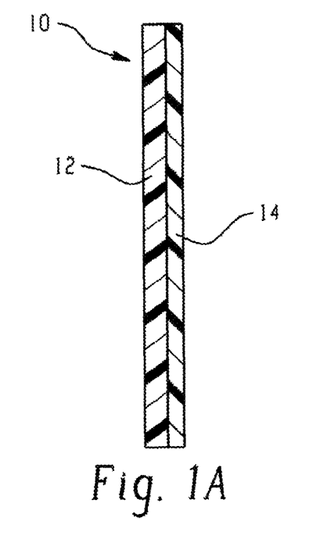
FIG. 1A illustrates an example of a multi-layer polycarbonate-polyester material.
Figure 1B:
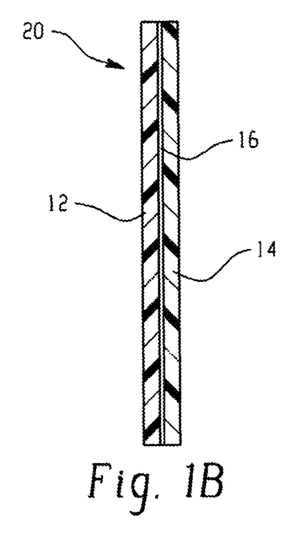
FIG. 1B illustrates an example of another multi-layer polycarbonate-polyester material.

Referring now to FIG. 1A, a multi-layer material 10 is shown and includes second layer 12 and first layer 14. As can be seen from FIG. 1A, multi-layer 10 is a bi-layer. Second layer 12 is formed at least in part of a polycarbonate material and can optionally comprise regrind or recycled polycarbonate and/or polyester or other recycled plastic material. First layer 14 is formed wholly or at least in part of a polyester material. FIG. 1B shows a multi-layer material having at least three layers 20 and includes second layer 12, first layer 14, and adhesion layer 16 between first layer 14 and second layer 12.

Figure 2:
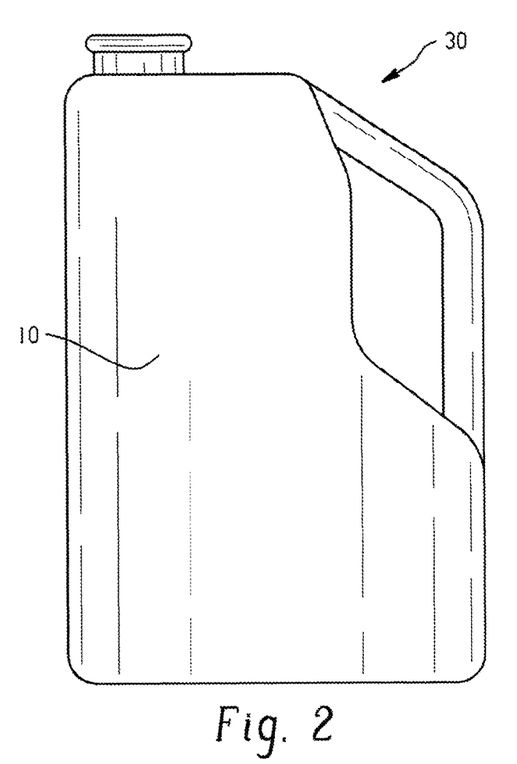
FIG. 2 illustrates an example of a large bottle formed of a multi-layer polycarbonate-polyester material.

An example of a large-capacity bottle is large-capacity bottle 30 and is illustrated in FIG. 2. Bottle 30 can be designed, for example, for use as a large water bottle, e.g., for dispensing water. Such bottles typically hold several liters or gallons (e.g., 10 gallons (37.8 liters) of water, and can be used with water dispensers. As can also be seen from FIG. 2, large-capacity bottle 30 is formed of a polycarbonate-polyester material 10. Alternatively, large-capacity bottle 30 can be formed of a polycarbonate-polyester material 20 as shown in FIG. 1B.

Figure 3:
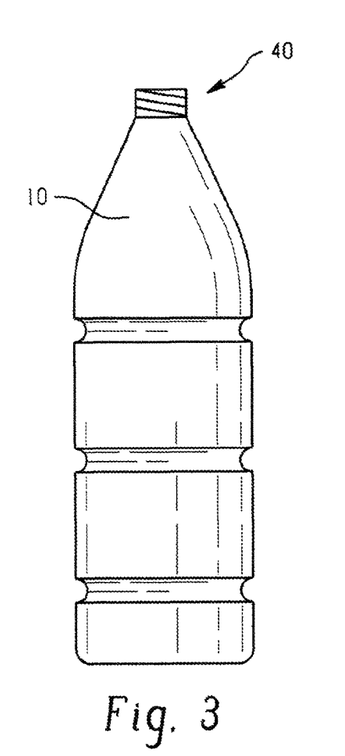
FIG. 3 illustrates an example of a beverage bottle formed of a multi-layer polycarbonate-polyester material.

An example of a beverage bottle is beverage bottle 40 and is illustrated in FIG. 3. As can be seen from FIG. 3, beverage bottle 40 is formed of a polycarbonate-polyester material 10. Alternatively, beverage bottle 40 can be formed of a polycarbonate-polyester material 20 as shown in FIG. 1B. Beverage bottle 40 can be designed for individual use, such as a water bottle. It will be appreciated that liquids other than water can be contained within bottle 30 or 40 (e.g., other beverages (such as carbonated beverages), medicines, and the like).

Figure 4:
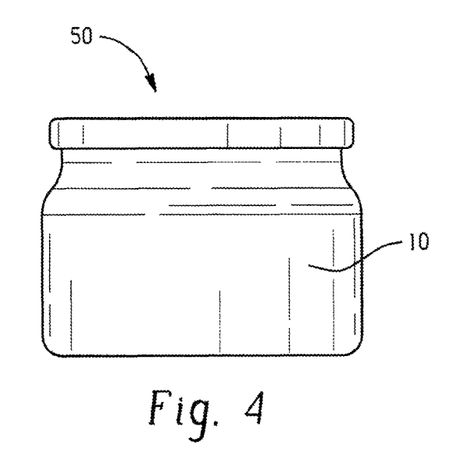
FIG. 4 illustrates an example of a food storage or healthcare container.

Referring now to FIG. 4, an example of a food or healthcare container is illustrated as food or healthcare container 50. Food or healthcare container 50 is configured for use as a food container or healthcare product container. For example, food or healthcare container 50, which is formed of a polycarbonate-polyester material 10 or polycarbonate-polyester material 20, can be used to store jams, jellies, or other foods. Alternatively, food or healthcare container 50 can be configured to contain healthcare products, such as lotions, cosmetics, medicinal products or the like. Food or healthcare container 50 can be particularly useful in applications where glass jars have previously been used or continue to be used, and/or in situations such as food packaging where sterilization processes are needed or are desirable.

Figure 5:
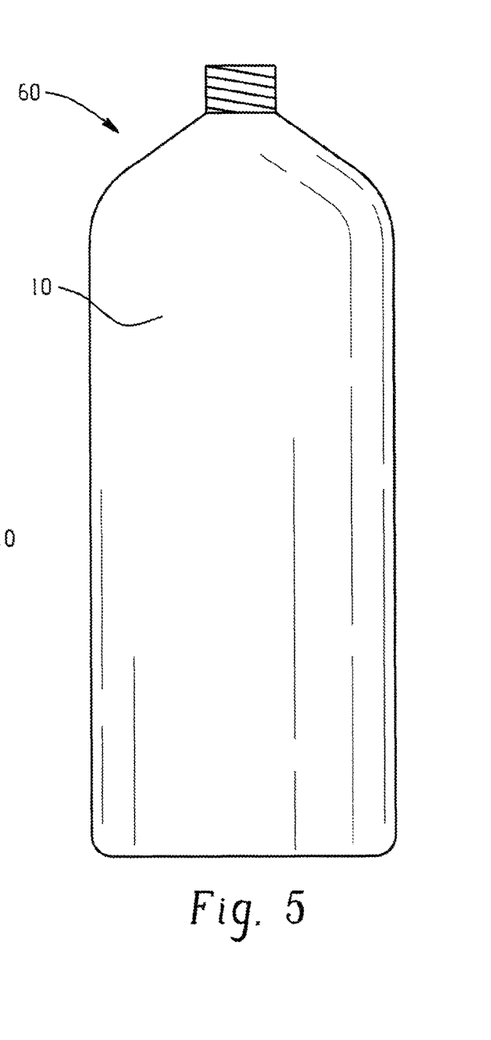
FIG. 5 illustrates an example of another type of bottle or container.

Another application for the multi-layer materials disclosed herein includes container 60 configured to replace polypropylene (PP) and/or polystyrene (PS) containers. More particularly, an example of a container is illustrated in FIG. 5 as container 60. Container 60 can be formed of a polycarbonate-polyester material 10 or polycarbonate-polyester material 20, e.g., as a multi-layer container having greater than or equal to 2 layers. Container 60 disclosed herein could thus provide an advantage over prior polypropylene (PP) and/or polystyrene (PS) containers since PP and PS have exhibited deficiencies with regard to moisture sterilization. In addition to the container configuration shown in FIG. 5, container 60 could alternatively be configured in the shape of a plastic cup or the like.

It will be appreciated that any of the shapes of the containers in the figures is merely exemplary and not limiting. The container can be any desired shape that can accommodate the contents in the container, and wherein the second layer does not have contact with the contents in the container.

While the thickness of the articles and containers disclosed herein can vary depending on the desired use and application, the total thickness of the articles can be 0.4 to 4 mm, specifically, 0.5 to 3 mm, more specifically, 0.5 to 1 mm in total thickness. The total thickness can be 1 to 4 mm, specifically, 1.1 to 4 mm, or 1.5 to 4 mm. The inner layer can be 0.05 to 3.95 mm, specifically, 0.1 to 1 mm or 0.1 to 0.9 mm. The inner layer can be 0.1 to 3.95 mm, specifically, 0.2 to 3.95 mm, more specifically, 1.1 to 3.95 mm or 0.2 to 0.5 mm.

A thickness ratio of the inner layer to the second layer can be 1:9 to 1:1, specifically, 1:9 to 4:6. It can be desirable for certain bottles (e.g., water bottles) to have second layer thicknesses (formed from, for example, polycarbonate-containing materials and/or recycle material) of 90% thickness relative to the total thickness of the bottle and for the inner layer to have thicknesses of 10% thickness relative to the total thickness of the bottle. For other applications such as food packaging and/or healthcare containers where oxygen and/or water barrier properties can be more significant, it can be desirable to use configurations where the inner layer is thicker. For example, in certain applications, it could be desirable to have second layer thicknesses (formed from, for example, polycarbonate-containing materials and/or recycled material) of 50% thickness relative to the total thickness of the bottle and for the inner layer to have thicknesses of 50% thickness relative to the total thickness of the bottle. Alternatively, it can be desirable to have second layer thicknesses (formed from, for example, polycarbonate-containing materials and/or recycled material) of 40% thickness relative to the total thickness of the bottle and for the inner layer to have thicknesses of 60% thickness relative to the total thickness of the bottle.

For purposes of illustration, one particular example includes a container having a total thickness of 1 mm, with a 0.5 mm polycarbonate second layer and 0.5 mm terephthalic copolyester inner layer, specifically, a PTTC, PCTG, or PETG inner layer, and can have water transmission of 4.2 $g/m^2$ after a day and/or oxygen transmission of 57 $cc/m^2$ after a day. Such a container can provide appropriate barrier properties for food packaging applications to replace glass jars (for example, for use in the packaging of jams, jellies, and the like). It will be appreciated that the relative thicknesses can therefore vary depending on the intended use of the container and desired properties of the container. In the foregoing embodiment a PTTC layer is particularly useful.

One or more of the layers of the multi-layer material can comprise an additive with the proviso that the additive(s) are selected so as to not significantly adversely affect, for example, one or more of water barrier properties, oxygen barrier properties, and transparency. Such additives can be mixed at a suitable time during the mixing of the components for forming the composition. Additives include reinforcing agents, antioxidants, heat stabilizers, light stabilizers, ultraviolet (UV) light stabilizers, plasticizers, lubricants, mold release agents, antistatic agents, colorants such as titanium dioxide, carbon black, and organic dyes, surface effect additives, radiation stabilizers, flame retardants, and anti-drip agents. A combination of additives can be used. In general, the additives are used in the amounts generally known to be effective. The total amount of additives (other than any reinforcing agents) is generally 0.01 to 5 wt %, based on the total weight of the second layer composition.

As mentioned above, the containers disclosed herein can be formed into various configurations. For example, the container can be a medicine, food, or beverage container such as a bottle, e.g., a water bottle. Examples of bottles include a baby bottle, beverage bottle (e.g., juice bottle, water bottle, carbonated drink bottle, alcoholic beverage bottle), medical bottle, and personal care bottle. The beverage bottle can have a capacity of two liters, a capacity of 20 ounces, a capacity of 16.9 ounces, a capacity of 12 ounces, a capacity of 6 ounces, a capacity of 4 ounces, or a filled weight of 200 to 800 grams.

These containers can be formed by various processes, depending upon the particular materials being used and the desired properties or characteristics of the container. Examples of processes for forming the container include: thermoforming, coextrusion, lamination, and coating processes, injection molding, blow molding, over-molding, as well as methods comprising at least one of the foregoing; e.g., co-injection molding, injection over-molding, injection blow molding (e.g., co-injection blow molding), injection stretch blow molding, extrusion blow molding, and extrusion stretch blow molding (one or two step).

For example, the production process can include extrusion blow molding with the multi-layers, injection molding of the multi-layers or blowing a preform produced in two or more than two materials.

For example, extrusion blow molding is a process where the granules are melted and plasticized with the help of a screw inside a cylinder. The plasticized polymer can be extruded as a hollow pipe called a parison. The parison can then be cut to a definite length and introduced into a blow mold and subjected to treatment by air. The air can then force the hollow parison against the sides of the mold. After a short cooling time, the part can be then ejected from the mold. The extruder can produce the continuous hollow parison and thus allows for the use of many molds for desirable production.

For producing containers having multiple layers, the process can be similar to a blow molding process except that multi-layer extrusion heads can be used to form multiple layers in a container. Such die heads allow the material to flow in layers such that a parison of uniform thickness can be achieved. An advantage of such a process is that different types of materials having various properties for special or desirable requirements can be utilized.

Another process can also be co-injection molding of containers comprising two similar or different kinds of materials. Two similar or different kinds of materials, having separate entering melt streams enter into a cavity where the material cools down to obtain a final shape. Co-injection nozzles or similar kinds of valves can be used for such a process in order to achieve a uniform melt flow into the cavity. Similar kinds of processes can also be used for preform molding in the first step and then these preforms can be further used in a blow molding process.

Another process which can also be used to form containers disclosed herein can be injection blow molding or stretch blow molding. In an injection blow molding process, a preform can be molded first by a standard injection process which can then be shifted to a blow molding station and inflated and cooled down. The injection blow molding machine can be based on an extruder barrel and screw assembly, which can melt the polymer. The molten polymer can be fed into a hot runner manifold where it can be injected through nozzles into a hollow, heated preform mold. The preform mold can form the external shape and can be clamped around a mandrel (the core rod), which can form the internal shape of the preform. The preform can include a fully formed bottle/jar neck with a thick tube of polymer attached, which can or will form the body. The preform mold can open and the core rod can be rotated and clamped into the hollow, chilled blow mold. The core rod can be opened and compressed air can be allowed into the preform, which can inflate it to the finished article shape. After a cooling period, the blow mold can be opened and the core rod can be rotated to the ejection position. The finished article can be stripped off the core rod and leak-tested prior to packing. The preform and blow mold can have many cavities, typically three to sixteen depending on the article size and the required output. There can be three sets of core rods, which allow concurrent preform injection, blow molding and ejection.

In stretch blow molding processes, the preforms can be heated above their glass transition temperature then blown using high pressure air into bottles using metal blow molds. The preform can be stretched with a core rod as part of the process. In the single-stage process, both preform manufacture and bottle blowing can be performed in the same machine. The stretching of some polymers can result in strain hardening of the resin, allowing the bottles to have better strength. Since heating above the glass transition temperature can affect transparency, another process can be more preferable.

The following examples are provided to illustrate the multi-layer materials. The examples are merely illustrative and are not intended to limit devices made in accordance with the disclosure to the materials, conditions, or process parameters set forth therein.

EXAMPLES

Example 1

Sample Preparation

Mono-layer and multi-layer 375 cubic centimeter (cc) 'Ketchup bottles' were prepared using extrusion blow molding machine WMB4 100/16 with a die head of S1/60 coex 6-7 and a tool of 375 milliliter (mL) ketchup bottle using LEXAN™ PK2870-11204, LEXAN™ PK2870-BL8E055T, or a different polycarbonate second layer. The nomenclature, details, and composition of the multi-layers used to make the various containers are shown in Table 1.

TABLE 1

| Multi-layer | Composition | PC commercial grades | Layer thickness, d (mm) |
|---|---|---|---|
| 1 | PC mono-layer | LEXAN™ PK2870-11204 | 0.65 |
| 2 | PTTC mono-layer | — | 0.65 |
| 3 | PC/PTTC (50/50) | LEXAN™ PK2870-11204 | 0.32/0.32 |
| 4 | PC/PTTC (70/30) | LEXAN™ PK2870-11204 | 0.455/0.245 |
| 5 | PC/PCTG (70/30) | LEXAN™ PK2870-11204 | 0.455/0.245 |
| 6 | PC/PCTG (87/13) | LEXAN™ PK2870-11204 | 0.565/0.135 |
| 7 | PC/copolyamide PA 6I/6T (85/15) | LEXAN™ PK2870-11204 | 0.51/0.09 |
| 8 | PC mono-layer | LEXAN™ PK2870-BL8E055T | 0.65 |
| 9 | PC/PET (80/20) | LEXAN™ PK2870-BL8E055T | 0.5/0.1 |
| 10 | PC/PEN (80/20) | LEXAN™ PK2870-BL8E055T | 0.58/0.1 |
| 11 | PC/PEN (70/30) | LEXAN™ PK2870-BL8E055T | 0.47/0.19 |
| 12 | PC/PEN (50/50) | LEXAN™ PK2870-BL8E055T | 0.33/0.33 |

Multi-layers 1-12 were formed into containers 1-12, respectively, and were dried in an oven at specific temperature and time as indicated in Table 2. After, they were used for co-extrusion blow molding using the processing setting (melt pressure, melt temperature of outer and inner layer resin, parison temperature, cycle time, and blow molding time) as indicated in Table 2. In the table, (s) is seconds and (hr) is hours.

By visual inspection, all of the bi-layer containers except for Container 7 showed good adhesion upon processing. Moreover, differences in melt strength between polycarbonate and polyamide of Example 7 caused inconsistent processing. Containers 3-6 and 10-12 showed good processability with good adhesion between the layers. It is noted that the present multilayer article provides a greater range of thicknesses for the respective layers as compared to a multilayer article comprising an inner EVOH layer comprising an ethylene vinyl alcohol copolymer (EVOH) that is more limited in its thickness range. Moreover, EVOH layers have a more limited thermal stability in combination with high heat resins such as polycarbonates during processing.

Example 2

Sterilization

Containers 1-12 were subjected to sterilization processes of autoclaving the unfilled containers, open mouth down in a Zirbus Labstar 3-4-7 autoclave at 120° C. for 30 minutes at 1.2 bars (autoclave 1) and 135° C. for 45 minutes at 1.8 bars (autoclave 2). The transmission and haze values were determined before and after sterilization according to measurements according to ASTM D1003 on a BYK Dual Haze guard and are shown in Table 3. Visual peel-off characteristics were determined after incision of the wall with a razor blade.

TABLE 2

| | Container | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pre-drying conditions | | | | | | | | | | | | |
| Predrying of PC layer (° C.) | 120 | NA | 120 | 120 | 120 | 120 | 120 | 120 | 120 | 120 | 120 | 120 |
| Predrying of PC layer (hr) | 4 | NA | 4 | 4 | 4 | 4 | 4 | 4 | 4 | 4 | 4 | 4 |
| Predrying of inner layer (° C.) | NA | 90 | 90 | 90 | 90 | 90 | 90 | NA | 120 | 160 | 160 | 160 |
| Predrying of inner layer (hr) | NA | NA | 6 | 6 | 6 | 6 | 12 | NA | 6 | 6 | 6 | 6 |
| Co-extrusion Blow molding | | | | | | | | | | | | |
| Melt pressure of PC (bar) | 100 | 128 | 55 | 57 | 86 | 79 | 102 | 100 | 117 | 90 | 86 | 83 |
| Melt pressure of inner layer (bar) | NA | NA | 78 | 56 | 37 | 35 | 36 | NA | 18 | 32 | 45 | 50 |
| Melt temperature of PC layer (° C.) | 263 | 241 | 263 | 264 | 264 | 256 | 265 | 263 | 260 | 258 | 258 | 258 |
| Melt temperature of inner layer (° C.) | NA | NA | 251 | 250 | 60 | 259 | 257 | NA | 255 | 281 | 281 | 281 |
| Parison temperature (° C.) | 258 | 260 | 260 | 260 | 265 | 245 | 260 | 258 | 260 | 260 | 260 | 260 |
| Blowing time (s) | 9 | 8.5 | 8 | 8 | 6 | 5.3 | 6 | 9 | 9 | 12.5 | 12 | 11.8 |
| Cycle time (s) | 14.2 | 14.2 | 13.2 | 13.2 | 13.2 | 10.5 | 11.2 | 14.2 | 14.5 | 17.7 | 17.1 | 16.8 |
| Adhesion | NA | NA | Y | Y | Y | Y | N | NA | Y | Y | Y | Y |

*NA—not applicable,
Y—Yes,
N—No

TABLE 3

| | Container | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Initial properties | | | | | | | | | | | | |
| Transmission (%) | 91.8 | 91.4 | 91.2 | 91.7 | 91.8 | 92 | — | 83.5 | 84.7 | 82.9 | 82.9 | 83.1 |
| Haze (%) | 1.5 | 1.22 | 1.68 | 1.67 | 1.55 | 1.52 | — | 3.2 | 4.77 | 2.99 | 3 | 3.1 |
| Autoclave 1 | | | | | | | | | | | | |
| Peel off (visual observation) | No | No | No | No | No | No | Yes | No | No | No | No | No |
| Haze (visual observation) | No | Yes | No | No | Yes | Yes | No | No | Yes | No | No | No |
| Mechanical deformation (visual observation) | No | Yes | No | No | No | No | No | No | Yes | No | No | No |
| Transmission (%) | 91.7 | 89.1 | 91.1 | 91.3 | — | — | — | 82.3 | 66.4 | 83 | 82.8 | 83 |
| Haze (%) | 1.51 | 34.2 | 2.88 | 1.68 | — | — | — | 2.68 | 80.1 | 4.2 | 6.6 | 5.8 |
| Delta Transmission (%) | −0.1 | −2.3 | −0.1 | −0.4 | — | — | — | −1.2 | −18.3 | −0.2 | −0.1 | −0.1 |
| Delta Haze (%) | 0.01 | 32.98 | 1.2 | 0.01 | — | — | — | −0.52 | 75.3 | 1.2 | 3.6 | 2.7 |
| Autoclave 2 | | | | | | | | | | | | |
| Transmission (%) | 91 | — | — | — | — | — | — | — | 66.4 | 82.8 | — | — |
| Haze (%) | 2.5 | — | — | — | — | — | — | — | 80.1 | 6.6 | — | — |
| Delta Transmission (%) | −0.8 | — | — | — | — | — | — | — | −18.3 | −0.1 | — | — |
| Delta Haze (%) | 1 | — | — | — | — | — | — | — | 75.3 | 3.6 | — | — |
| Oxygen Barrier Properties | | | | | | | | | | | | |
| Theoretical OTR at thickness d ((cc)/(m² day at m)) | 169 | 46.1 | 73.7 | 81.3 | 34.9 | 53.7 | 5.5 | 169 | 34 | 16.4 | 9.1 | 5.4 |
| Normalized theoretical OTR (mm(cc)/(m²day atm)) | 110 | 30.0 | 47.2 | 56.9 | 20.9 | 37.6 | 3.3 | 109.9 | 20.3 | 11.2 | 5.9 | 3.6 |

Table 3 shows that Container 9 comprising a polyethylene terephthalate and Containers 10-12 comprising polyethylene naphthalate had initial transmission values of less than 85% and initial haze values of greater than or equal to 3%. Containers 3-6 comprise initial transmission values of greater than 90% and initial haze values of less than 2.5%. Table 3 further shows that after autoclave procedure 1, Containers 3 and 4 displayed no visual haze and maintained a transmission of greater than 90% and a haze of less than 3%. Table 3 therefore clearly illustrates that Containers 3 and 4 are surprisingly able to maintain low haze values, high transmission values with no peel off.

Figure 6:
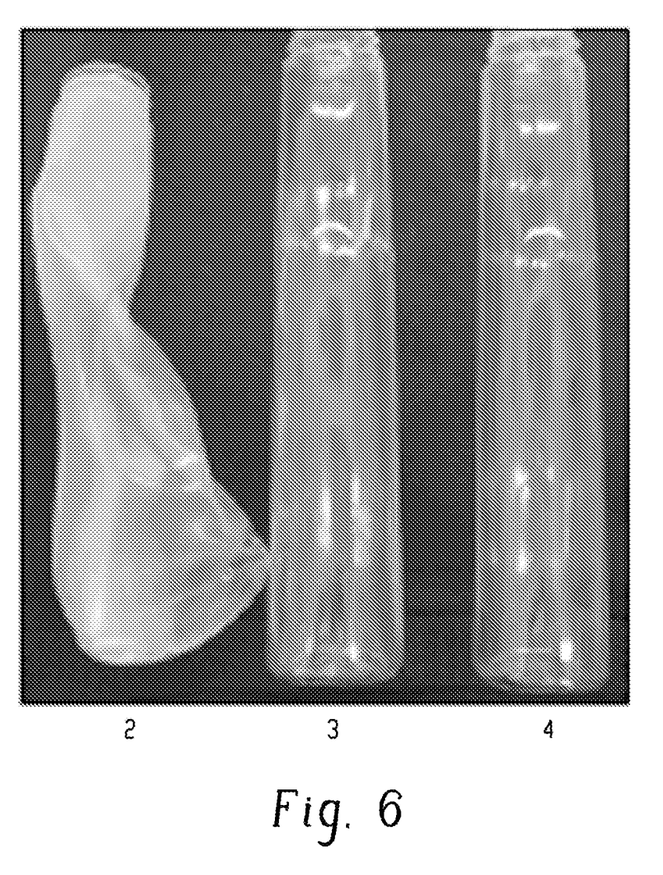
FIG. 6 is a photograph of Containers 2-3 after autoclave procedure 1 of Example 2.

FIG. 6 further illustrates the surprising results of Table 3. FIG. 6 is a photograph of three Bottles 2, 3, and 4 comprising the materials of Containers 2, 3, and 4 and described in Table 1. Bottle 2 comprising a single layer polyester layer shows significant haze formation as well as physical deformation. In contrast, Bottles 3 and 4 showed no visual haze formation and maintained their original shape.

TABLE 4

| Multi-layer | Composition | PC commercial grades | Layer thicknesses, d (mm) |
|---|---|---|---|
| 13 | PC | LEXAN ™ 141R-111 | 0.6 |
| 14 | PEN | — | 0.6 |
| 15 | PC/PEN | LEXAN ™ 141R-111 | 0.5/0.1 |
| 16 | PC/PEN | LEXAN ™ 141R-111 | 0.4/0.2 |
| 17 | PC/PEN | LEXAN ™ 141R-111 | 0.3/0.3 |
| 18 | PC + PEN | LEXAN ™ 141R-111/LEXAN ™ 141R-111 mixed with 2 wt % PEN | 0.6 |

Example 3

Oxygen Transmission

As explained above, long shelve life food packaging (6 months up to 2 years) can have an oxygen transmission rate (OTR) of less than 125 cc/m²·day·atm, or less than or equal to 100 cc/m²·day·atm, specifically, less than or equal to 10 cc/m²·day·atm. While polycarbonate alone has a poor OTR performance of 169 cc/m²·day·atm as indicated in Containers 1 and 8, it was surprisingly found that multi-layer materials comprising an inner polyester layer were able to achieve reduced oxygen transmission rates as is shown in Table 3. It is noted that the theoretical OTR at thickness d of multilayer structures composed of n layers can be estimated by applying the following formula:

$$1/P = \Sigma_{(i=1 \text{ to } n)} t_i / P_i$$

wherein n is the number of layers i, P is the permeability of the given structure in cc·d/m²·day·atm, $t_i$ is the thickness of the i layer in micrometers, $P_i$ is the permeability coefficient of the i layer in cc·mm/m²·day·atm, d total thickness of multilayer structure.

Table 3 shows that the theoretical OTR of Containers 7, 11, and 12 resulted in the most improved OTRs of only 5.5, 9.1 and 5.4 cc/m²·day·atm, respectively. Containers 3 and 4 resulted in reduced OTRs, in comparison to mono-layer polycarbonate Containers 1 and 8, of 73.7 and 81.3 cc/m²·day·atm, respectively.

Example 4

Polyethylene Naphthalate Inner Layers

The Applicants surprisingly found that multi-layer materials comprising a polyethylene naphthalate inner layer could be formed to achieve both transmission values of greater than 90% and low haze values of less than 2.5%. Specifically, Containers 13-18 were formed from the multi-layers 13-18, respectively, as shown in Table 4 and by a film co-extrusion procedure as shown in Table 5. In Table 5, (rpm) is revolutions per minute.

TABLE 5

| | Multi-layer | | | | | |
|---|---|---|---|---|---|---|
| | 13 | 14 | 15 | 16 | 17 | 18 |
| Pre-drying conditions | | | | | | |
| Predrying of polycarbonate (° C.)/(hr) | 120/4 | NA | 120/4 | 120/4 | 120/4 | 120/4 |
| Predrying of inner resin (° C.)/(hr) | NA | 160/6 | 160/6 | 160/6 | 160/6 | 160/6 |
| Film thickness (micrometers) | | | | | | |
| Total | 600 | 600 | 600 | 600 | 600 | 600 |
| Cap-layer | — | — | 100 | 200 | 300 | 200 |
| Core-extruder | | | | | | |
| Polymer | PC | PEN | PC | PC | PC | PC |
| Zone 1 (° C.) | 315 | 270 | 295 | 295 | 295 | 295 |
| Zone 2 (° C.) | 320 | 270 | 300 | 300 | 300 | 300 |
| Zone 3 (° C.) | 325 | 276 | 305 | 305 | 305 | 305 |
| Zone 4 (° C.) | 330 | 285 | 310 | 310 | 310 | 310 |
| Zone 5 (° C.) | 90 | 80 | 100 | 100 | 100 | 100 |
| Melt pressure (bar) | 82 | 203 | 114 | 116 | 115 | 101 |
| Screw speed (rpm) | 95 | 145 | 113 | 93 | 72.5 | 93 |
| Cap extruder | | | | | | |
| Polymer | PC | PEN | PEN | PEN | PEN | Blend |
| Zone 1 (° C.) | 305 | 270 | 270 | 270 | 270 | 270 |
| Zone 2 (° C.) | 304 | 275 | 275 | 275 | 275 | 275 |
| Zone 3 (° C.) | 315 | 280 | 280 | 280 | 280 | 280 |
| Zone 4 (° C.) | 320 | 290 | 290 | 290 | 290 | 290 |
| Zone 5 (° C.) | 80 | 85 | 85 | 85 | 85 | 85 |
| Melt pressure (bar) | 108 | 192 | 148 | — | — | 181 |
| Screw speed (rpm) | 32 | 15 | 32 | 52 | 72.5 | 52 |
| Co-ex block | | | | | | |
| Zone 1 (° C.) | 295 | 277 | 290 | 290 | 290 | 290 |
| Zone 2 (° C.) | 295 | 277 | 290 | 290 | 290 | 290 |

TABLE 5-continued

| | Multi-layer | | | | | |
|---|---|---|---|---|---|---|
| | 13 | 14 | 15 | 16 | 17 | 18 |
| Roll stack | | | | | | |
| Temperature (° C.) | 295 | 277 | 290 | 290 | 290 | 290 |
| Slit (mm) | 0.9 | 0.9 | 0.9 | 0.9 | 0.9 | 0.9 |
| Die | | | | | | |
| Temperature (° C.) | 131 | 100 | 105 | 103 | 100 | 100 |

The optical and oxygen barrier properties of Multi-layers 13-18 were then determined and are shown in Table 6. The measurement of the oxygen transmission rate on the films was determined on MOCON OTR equipment according to ISO 15105-2, ANNEX A at 23° C. and 50% relative humidity, to simulate storage of liquid foodstuff at ambient temperatures. The PEN side of the multi-layer was exposed to the oxygen upon OTR testing. Theoretically, the OTR values of multi-layer structures can be determined using the thicknesses and permeability values of the individual resin components such as PEN and polycarbonate, where the permeability values of non-oriented PEN and polycarbonate are known in literature to be respectively 1.8 and 110 cc·mm/m²/atm.

Table 6 shows that by forming the containers from co-extruded multi-layer materials, that transmission values of greater than 90% and haze values of less than 2.5% can be achieved. Surprisingly, it was observed that multi-layers 11, 12, 16, and 17 further show excellent transmission and low haze retention when exposed to autoclave conditions (30 minutes exposure at 120° C.; exposure at 15° C. above the Tg of PEN), with delta transmission and delta haze values of respectively <1% and <3.6%. Surprisingly, no deformation of multi-layers 11, 12, 16, and 17 was observed upon autoclaving at 30 minutes at 120° C. (1.2 bar) and 135° C. (1.8 bar) for 45 minutes. Table 6 shows that a PEN layer thickness of greater than 100 micrometers results in an OTR of less than 10 (cc)/(m²·day·atm). Further, multi-layers 11, 12, 16, and 17 show OTR values of less than 6 (cc)/(m²·atm·day), which make them particularly suitable for hot filled and autoclavable single use packaging applications with excellent optical, mechanical, oxygen barrier, and thermal stability.

TABLE 6

| | Multi-layer | | | | | |
|---|---|---|---|---|---|---|
| | 13 | 14 | 15 | 16 | 17 | 18 |
| Optical properties | | | | | | |
| Transmission (%) | 91.0 | 89.1 | 90.2 | 90.1 | 90.1 | — |
| Haze (%) | 0.66 | 0.64 | 0.32 | 0.44 | 0.51 | 15-25 |
| Oxygen barrier properties ((cc)/(m²·day·atm)) at thickness d | | | | | | |
| Theoretical OTR | 183 | 3 | 16.6 | 8.7 | 5.9 | — |
| Experimental OTR [ISO 15105-2] | 132 | ≤2.3 | 10.3 | 5.9 | 4.7 | — |
| Normalizedl Theoretica OTR | 109.8 | 1.8 | 10.0 | 5.2 | 3.5 | |

Table 6 further shows that multi-layer 18 comprising an outer PC layer comprising 2 wt % PEN resulted in a surprisingly high haze as compared to PC outer layers that were free of PEN. This increase in haze indicates that the PC and PEN are not miscible.

Set forth below are some embodiments of the articles and methods for making the same.

Embodiment 1: A multi-layer article having an interior, the article comprising: a second layer comprising a bisphenol A polycarbonate; and a first inner layer, wherein the inner layer forms a barrier between the second layer and the interior. The inner layer comprises a polyester. The article can have at least one of: a decrease in transparency of less than or equal to 5% after sterilization in an autoclave for 30 minutes at 120° C., and a decrease in transparency of less than or equal to 5% after 50 cycles of hot filling with water for 30 minutes at 90° C.

Embodiment 2: The article of Embodiment 1, wherein the polyester comprises a terephthalic copolyester; polyethylene furanoate; polyethylene naphthalate; or a combination comprising at least one of the foregoing.

Embodiment 3: The article of Embodiment 2, wherein the terephthalic copolyester is a copolyester derived from a terephthalic acid, an optional dicarboxylic acid other than the terephthalic acid, and two or more diols; and the polyethylene furanoate is derived from 2,5-furan dicarboxylic acid; an optional dicarboxylic acid other than the 2,5-furan dicarboxylic acid; and a glycol component comprising ethylene glycol.

Embodiment 4: The article of Embodiment 3, wherein the two or more diols comprise 2,2,4,4-tetramethyl-1,3-cyclobutanediol, cyclohexanedimethanol, ethylene glycol, diethylene glycol, 1,2-propanediol, 1,3-propanediol, neopentyl glycol, 1,4-butanediol, 1,5-pentanediol, 1,6-hexanediol, p-xylene glycol, polytetramethylene glycol, pentaspiroglycol, or 2,2-dimethyl-1,3-propanediol.

Embodiment 5: The article of any of Embodiments 3-4, wherein the two or more diols comprise 80 to 99 mol % of 2,2,4,4-tetramethyl-1,3-cyclobutanediol and 1 to 20 mol % cyclohexanedimethanol, ethylene glycol, or a combination comprising one or both of the foregoing.

Embodiment 6: The article of any one of Embodiments 3-5, wherein the dicarboxylic acid other than the terephthalic acid or 2,5-furan dicarboxylic acid comprises isophthalic acid, 4,4'-biphenyldicarboxylic acid, naphthalenedicarboxylic acid, trans-4,4'-stilbenedicarboxylic acid cyclohexanedicarboxylic acid, malonic dicarboxylic acid, succinic dicarboxylic acid, glutaric dicarboxylic acid, adipic dicarboxylic acid, pimelic dicarboxylic acid, suberic dicarboxylic acid, azelaic dicarboxylic acid, dodecanedioic dicarboxylic acid, indan-1,3-dicarboxylic acid, 1,2,3-trimethyl-3-phenylindan-4',5-dicarboxylic acid, 1,1,3-trimethyl-5-carboxy-3-(4-carboxyphenyl)indan dicarboxylic acid, or a combination comprising at least one of the foregoing.

Embodiment 7: The article of any one of Embodiments 3-6, wherein the terephthalic acid or 2,5-furan dicarboxylic acid is present in an amount of 70 to 100 mol % and the dicarboxylic acid is present in an amount of 0 to 30 mol % based on the total number of moles in the terephthalic copolyester or in the polyethylene furanoate.

Embodiment 8: The article of any of Embodiments 2-7, wherein the polyester has an inherent viscosity of 0.35 to less than 0.70 deciliters per gram as determined in 60:40 (wt:wt) phenol:tetrachloroethane solution at 0.5 grams per 100 milliliters at 25° C.

Embodiment 9: The article of any one of the preceding embodiments, wherein the polyester comprises a pentaspiroglycol copolyester comprising repeat units derived from one or both of terephthalic acid and dimethyl terephthalate.

Embodiment 10: The article of any one of the preceding embodiments, wherein the polyester comprises a pentaspiroglycol copolyester, wherein the pentaspiroglycol copolyester comprises poly(pentaspiroglycol terephthalate)-co-poly(ethylene terephthalate).

Embodiment 11: The article of any of the foregoing embodiments, wherein the polyester comprises repeat units derived from isophthalic acid, 4,4'-biphenyldicarboxylic acid, naphthalenedicarboxylic acid, trans-4,4'-stilbenedicarboxylic acid cyclohexane dicarboxylic acid, malonic dicarboxylic acid, succinic dicarboxylic acid, glutaric dicarboxylic acid, adipic dicarboxylic acid, pimelic dicarboxylic acid, suberic dicarboxylic acid, azelaic dicarboxylic acid, and dodecanedioic dicarboxylic acids, indan-1,3-dicarboxylic acid, 1,2,3-trimethyl-3-phenylindan-4',5-dicarboxylic acid, 1,1,3-trimethyl-5-carboxy-3-(4-carboxy phenyl) indan dicarboxylic acid, or a combination comprising at least one of the foregoing.

Embodiment 12: The article of any one of the foregoing embodiments, wherein the polyester comprises a terephthalic copolyester that comprises dimethyl terephthalate, 1,4-cyclohexanedimethanol, and 2,2,4,4-tetramethyl-1,3-cyclobutanediol.

Embodiment 13: The article of any one of the foregoing embodiments, wherein the polyester comprises poly(2,2,4,4-tetramethyl-1,3-cyclobutylene terephthalate)-co-poly(cyclohexanedimethylene terephthalate).

Embodiment 14: The article of any one of the foregoing embodiments, wherein the polyester comprises a poly(cyclohexanedimethylene terephthalate)-co-poly(ethylene terephthalate) comprising greater than 50 to 99.9 mol % of poly(1,4-cyclohexanedimethylene terephthalate).

Embodiment 15: The article of any one of the foregoing embodiments, wherein the polyester comprises poly(cyclohexanedimethylene terephthalate)-co-poly(ethylene terephthalate) comprising greater than 50 to 99.9 mol % of poly(ethylene terephthalate).

Embodiment 16: The article of any one of the foregoing embodiments, wherein the polyester is derived from a terephthalic acid and a dicarboxylic acid and wherein the terephthalic acid is present in an amount of 70 to 100 mol % and the dicarboxylic acid is present in an amount of 0 to 30 mol %, specifically, more than 0 to 30 to 30 mol % based on the total number of moles in the polyester.

Embodiment 17: The article of any one of the foregoing embodiments, wherein the article has at least one of: a decrease in transparency of less than or equal to 5% after sterilization in an autoclave for 30 minutes at 120° C., and a decrease in transparency of less than or equal to 5% after 50 cycles of hot filling with water for 30 minutes at 90° C.

Embodiment 18: The article of any one of the foregoing embodiments, wherein the bisphenol A polycarbonate comprises a homopolycarbonate.

Embodiment 19: The article of any one of the foregoing embodiments, wherein the second layer comprises a recycled polycarbonate, a recycled polyester, or a combination comprising one or both of the foregoing.

Embodiment 20: The article of any one of the foregoing embodiments, further comprising one or both of an adhesion layer and a third polyester layer.

Embodiment 21: The article of any one of the foregoing embodiments, wherein the article has a transparency of greater than or equal to 90% as measured using a 2.5 millimeter (mm) plaque according to ASTM D-1003-00 Procedure A, Spectrophotometer, using illuminant C with diffuse illumination with unidirectional viewing.

Embodiment 22: The article of any one of the foregoing embodiments, wherein the article has a haze of less than or equal to 2.5% as measured in accordance with ASTM D1003 on a BYK Dual Haze guard.

Embodiment 23: The article of any one of the foregoing embodiments, wherein the total thickness of the article is 0.4 to 4 mm Embodiment 24: The article of any one of the foregoing embodiments, wherein the thickness of the inner layer is 0.1 to 1 mm Embodiment 25: The article of any one of the foregoing embodiments, wherein the article is a container, and, during use, the second layer has no contact with the contents within the container.

Embodiment 26: The article of any one of the foregoing embodiments, wherein the article has a thickness and wherein the second layer forms greater than or equal to 50% of the article thickness and the inner layer forms less than or equal to 50% of the article thickness.

Embodiment 27: The article of any one of the foregoing embodiments, wherein the article is a bottle having a capacity up to 37.8 liters.

Embodiment 28: The article of any one of the foregoing embodiments, wherein the article is a baby bottle, a water bottle, a jelly jar, or a tomato sauce jar.

Embodiment 29: A method of making the article of any of the preceding claims, comprising forming the article with the second layer and the inner layer using one or more of thermoforming, blow molding, extrusion blow molding, extrusion stretch molding, injection molding, injection blow molding, injection stretch blow molding, over-molding, or injection over-molding.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Unless otherwise stated, the test standards referred to herein are the most recent standards for that measurement method as of the date of filing of the priority application.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, copolymers, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments. "Or" means "and/or" unless the context specifies otherwise.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A multi-layer article having an interior, the article comprising:
    a second layer comprising a bisphenol A polycarbonate; and
    an inner layer comprising a terephthalic copolyester; polyethylene furanoate; or a combination comprising at least one of the foregoing;
    wherein the inner layer forms a barrier between the second layer and the interior; wherein the article has at least one of: a decrease in transparency of less than or equal to 5% after sterilization in an autoclave for 30 minutes at 120° C., and a decrease in transparency of less than or equal to 5% after 50 cycles of hot filling with water for 30 minutes at 90° C.

2. The article of claim 1, wherein the inner layer comprises a terephthalic copolyester comprising poly(2,2,4,4-tetramethyl-1,3-cyclobutylene terephthalate)-co-poly(cyclohexanedimethylene terephthalate).

3. The article of claim 1, wherein the inner layer comprises a terephthalic copolyester comprising a poly(cyclohexanedimethylene terephthalate)-co-poly(ethylene terephthalate) comprising greater than 50 mol % to 99.9 mol % of poly(1,4-cyclohexanedimethylene terephthalate).

4. The article of claim 1, wherein the inner layer comprises a terephthalic copolyester comprising poly(cyclohexanedimethylene terephthalate)-co-poly(ethylene terephthalate) comprising greater than 50 mol % to 99.9 mol % of poly(ethylene terephthalate).

5. The article of claim 1, wherein the inner layer comprises a terephthalic copolyester comprising poly(pentaspiroglycol terephthalate)-co-poly(ethylene terephthalate).

6. The article of claim 1, wherein the terephthalic copolyester or the polyethylene furanoate has an inherent viscosity of 0.35 to less than 0.70 deciliters per gram as determined in 60:40 (wt:wt) phenol:tetrachloroethane solution at a concentration of 0.5 grams per 100 milliliters at 25° C.

7. The article of claim 1, wherein the total thickness of the article is 0.4 to 4 mm and/or the thickness of the inner layer is 0.1 to 1 mm.

8. The article of claim 1, wherein the article is a container, and, during use, the second layer has no contact with the contents within the container.

9. The article of claim 1, wherein the article has a thickness and wherein the second layer forms greater than or equal to 50% of the article thickness and the inner layer forms less than or equal to 50% of the article thickness.

10. The article of claim 1, wherein the article is a bottle having a capacity up to 37.8 liters, wherein the article is a baby bottle, a jelly jar, a tomato sauce jar, or a water bottle.

11. A method of making the article of claim 1, comprising:

forming the article with the second layer and the inner layer using thermoforming, blow molding, extrusion blow molding, extrusion stretch molding, injection molding, injection blow molding, injection stretch blow molding, over-molding, injection over-molding, or a combination comprising at least one of the foregoing.

12. The article of claim 1, wherein the terephthalic copolyester is a copolyester derived from a terephthalic acid, an optional dicarboxylic acid other than the terephthalic acid, and two or more diols.

13. The article of claim 12, wherein the dicarboxylic acid other than the terephthalic acid or 2,5-furan dicarboxylic acid comprises isophthalic acid, 4,4'-biphenyldicarboxylic acid, naphthalenedicarboxylic acid, trans-4,4'-stilbenedicarboxylic acid cyclohexanedicarboxylic acid, malonic dicarboxylic acid, succinic dicarboxylic acid, glutaric dicarboxylic acid, adipic dicarboxylic acid, pimelic dicarboxylic acid, suberic dicarboxylic acid, azelaic dicarboxylic acid, dodecanedioic dicarboxylic acid, indan-1,3-dicarboxylic acid, 1,2,3-trimethyl-3-phenylindan-4',5-dicarboxylic acid, 1,1,3-trimethyl-5-carboxy-3-(4-carboxyphenyl)indan dicarboxylic acid, or a combination comprising at least one of the foregoing.

14. The article of claim 12, wherein the terephthalic acid or 2,5-furan dicarboxylic acid is present in an amount of 70 to 100 mol % and the optional dicarboxylic acid is present in an amount of more than 0 to 30 mol % based on the total number of moles in the terephthalic copolyester.

15. The article of claim 12, wherein the inner layer comprises the terephthalic copolyester and wherein the two or more diols comprise 2,2,4,4-tetramethyl-1,3-cyclobutanediol, cyclohexanedimethanol, ethylene glycol, diethylene glycol, 1,2-propanediol, 1,3-propanediol, neopentyl glycol, 1,4-butanediol, 1,5-pentanediol, 1,6-hexanediol, p-xylene glycol, polytetramethylene glycol, pentaspiroglycol, or 2,2-dimethyl-1,3-propanediol.

16. The article of claim 1, wherein the inner layer comprises the polyethylene furanoate.

17. The article of claim 16, wherein the polyethylene furanoate is a polyester derived from 2,5-furan dicarboxylic acid, an optional dicarboxylic acid other than the 2,5-furan dicarboxylic acid, and a glycol component comprising ethylene glycol.

* * * * *